United States Patent
Yokota

(10) Patent No.: US 6,909,968 B2
(45) Date of Patent: Jun. 21, 2005

(54) ARRIVAL DETECTION METHOD FOR NAVIGATION SYSTEM

(75) Inventor: Tatsuo Yokota, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/306,982

(22) Filed: Nov. 30, 2002

(65) Prior Publication Data

US 2004/0107048 A1 Jun. 3, 2004

(51) Int. Cl.[7] ............................................. G06F 15/50
(52) U.S. Cl. ....................... 701/211; 701/201; 701/209; 701/210; 340/995.19; 340/995.2; 340/995.23
(58) Field of Search ................................. 701/201, 209, 701/210, 211; 340/995.19, 995.2, 995.23

(56) References Cited

U.S. PATENT DOCUMENTS

| | | | | |
|---|---|---|---|---|
| 5,369,588 A | * | 11/1994 | Hayami et al. | 340/995.19 |
| 5,508,931 A | | 4/1996 | Snider | |
| 5,557,522 A | * | 9/1996 | Nakayama et al. | 701/200 |
| 5,793,631 A | * | 8/1998 | Ito et al. | 701/211 |
| 5,906,654 A | * | 5/1999 | Sato | 701/210 |
| 5,922,042 A | * | 7/1999 | Sekine et al. | 701/210 |
| 5,931,888 A | * | 8/1999 | Hiyokawa | 701/208 |
| 6,298,305 B1 | * | 10/2001 | Kadaba et al. | 701/211 |
| 6,456,936 B1 | * | 9/2002 | Neukirchen et al. | 701/213 |

FOREIGN PATENT DOCUMENTS

| | | |
|---|---|---|
| JP | 7-55488 | 3/1995 |
| JP | 7-63568 | 3/1995 |

* cited by examiner

*Primary Examiner*—Thomas G. Black
*Assistant Examiner*—Eric M. Gibson
(74) *Attorney, Agent, or Firm*—Muramatsu & Associates

(57) ABSTRACT

An arrival detection method for automatically detecting arrival of a current destination based on various conditions and proceeding to route guidance for the next destination when two or more destinations are specified. The method includes the steps of guiding a vehicle of the user to a current destination, detecting whether a current vehicle position is within a predetermined distance from the current destination, applying a primary condition when the vehicle is within the predetermined distance, applying a secondary condition when the primary condition is met, and determining arrival at the current destination when the secondary condition is met and proceeding to a route guidance operation for the next destination. The primary condition is a time length during which the vehicle is stationary within the predetermined distance from the current destination.

18 Claims, 10 Drawing Sheets

Fig. 2A
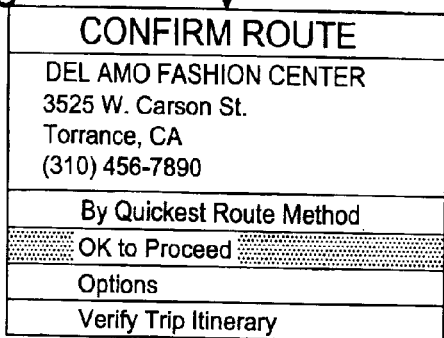
Fig. 2B
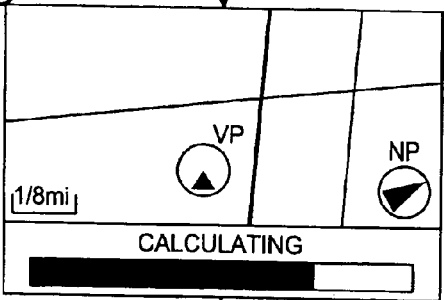
Fig. 2C
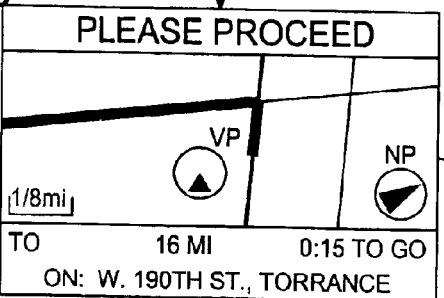
Fig. 2D
If the vehicle is already on a road
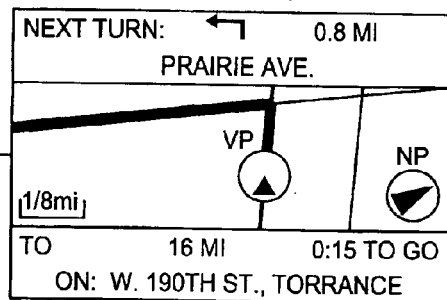
Fig. 2E  ROUTE GUIDANCE
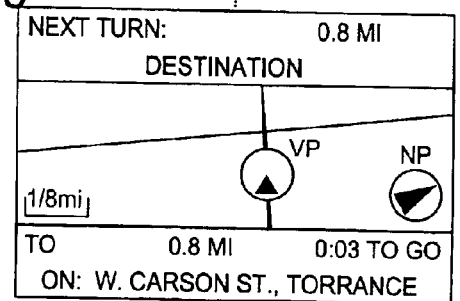
—"Guidance Map"

Fig. 2F
*ROUTE GUIDANCE*
*Fig. 2E*
<Arrival>
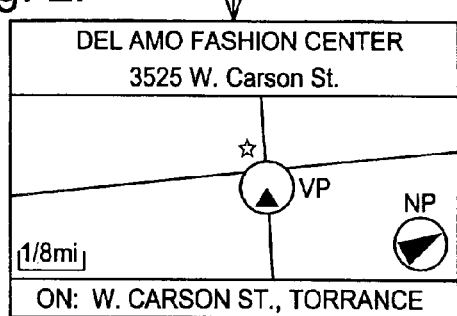
"Arrival Map"
Trip Itinerary Mode
<Cancel> or
Arrival Detection
Fig. 2G — Single Dest. mode / <Cancel> Locator Map
Fig. 2H
Next Destination
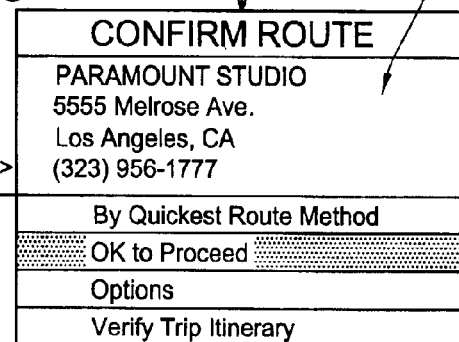
<Cancel>
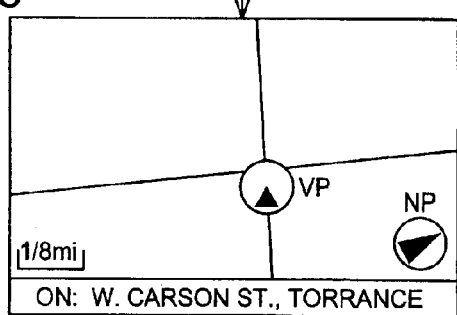
Fig. 2I
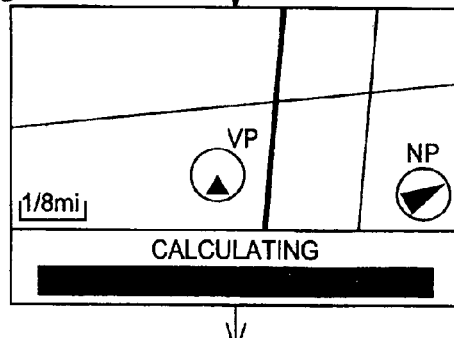

ARRIVAL DETECTION METHOD FOR NAVIGATION SYSTEM

FIELD OF THE INVENTION

This invention relates to a navigation method for use with a navigation system for guiding a user to the destinations, and more particularly, to an arrival detection method for automatically detecting arrival of a current destination based on various conditions, thereby determining a timing to proceed to a route guidance function for the next destination.

BACKGROUND OF THE INVENTION

A navigation system performs travel guidance for enabling a user to easily and quickly reach the selected destination. A typical example is a vehicle navigation system where the user drives the car having the navigation system. Such a navigation system detects the position of the vehicle, reads out map data pertaining to an area at the current vehicle position from a data storage medium, for example, a CD-ROM (compact disc read-only memory), a DVD (digital versatile disc), or a hard disc, and displays a map image on a monitor screen while superimposing a mark representing the current location of the user vehicle on the map image. Alternatively, such map data can be provided to the vehicle from a remote server through a communication network such as Internet.

When a destination is set, the navigation system starts a route guidance function for setting a guided route from the starting point to the destination. To determine the guided route to the destination, the navigation system calculates and determines an optimum route to the destination based on various parameters. For example, the guided route is determined based on the shortest way to reach the destination, the route preferring freeways to surface roads, the least expensive way to the destination, or the route without using toll road, and the like.

Typically, the route guidance function performs an intersection guidance process in which a monitor screen displays an enlarged intersection diagram and the direction in which the vehicle is to travel while displaying the guided route on a map. During the route guidance, the navigation system reads the nodes data from the data storage medium such as DVD and successively stores the nodes data of street segments (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other streets. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a user of the desired one of roads or directions selectable at the intersection. Such route guidance by the navigation system is also given by voice instruction.

There is a type of navigation system having a function that accepts two or more destinations. Sometimes, such a function is called a "Today's Plan" mode or a "Trip Itinerary" mode in which a user can specify two or more destinations and the order of the destinations. Typically, the navigation system detects the arrival of the current destination based on the address number on the street segment. Then the navigation system displays the address and/or the name of the destination to help the user find the exact location of the current destination such as one within a shopping mall.

After the detection of arrival at the current destination, at some point, the navigation system must proceed to show the next destination and start the route guidance to the next destination by calculating an optimum route to the next destination. However, it is difficult for the navigation system to know when the user would want to proceed to the next destination. Thus, a conventional technology incorporates a manual input means such as a "Next Destination" key which is so designed that the user activates the key when proceeding to the next destination.

FIG. 1 summarizes the foregoing procedure involving the "Next Destination" key. In the flow chart of FIG. 1, the navigation system calculates the route to the first destination and guides the user to the first destination at step 21. The navigation system measures a distance to the first destination, and when the distance is within a predetermined range, it generates an arrival notice at step 22. When the user has achieved the purpose at the first destination and wants to move to the second destination, he presses the "Next Destination" key of the navigation system in step 23.

Accordingly, at step 24, the navigation system determines the guided route to the second destination and guides the user to the second destination. Thus, the procedure similar to the above is repeated for the second destination. Namely, the navigation system measures a distance to the second destination, and when the distance is within the predetermined range, it generates an arrival notice at step 25. When the user has achieved the purpose at the second destination and wants to move to the third destination, he presses the "Next Destination" key of the navigation system to proceed to the third destination at step 26. In this manner, the procedure is repeated for the remaining destinations.

The above procedure involving the manual input means is cumbersome to the user because the user has to press the "Next Destination" key every time when the route guidance to the next destination has to be started. Without the manual input means, on the other hand, the conventional arrival detection method alone may prematurely display the next destination when the user still has not arrived at the actual destination. This is because the conventional detection method is affected by the limited accuracy of the map database. It is also possible that the navigation system does not show the next destination in a timely manner even if the user no longer has to stay at the current destination.

SUMMARY OF THE INVENTION

It is, therefore, an object of the present invention to provide an arrival detection method for automatically detecting arrival of a current destination based on various conditions and parameters and proceeding to route guidance for the next destination.

The present invention is a navigation method for detecting the arrival of the current destination and determining a time for start of route guidance for the next destination. The navigation method is comprised of the steps of guiding a vehicle of the user to a current destination through a route guidance operation of the navigation system, detecting whether a current vehicle position is within a predetermined distance from the current destination, applying a primary condition when the vehicle is within the predetermined distance, applying a secondary condition when the primary condition is met, and determining arrival at the current destination when the secondary condition is met and proceeding to a route guidance operation for the next destination.

According to the present invention, the arrival of the current destination is detected, and the navigation system proceeds in a timely fashion, to the route guidance operation for the next destination. The arrival detection method is performed with use of two or more conditions or parameters, thereby accurately detecting the arrival at the current destination. Accordingly, the navigation system is able to show a start-up screen such as the "Confirm Route" screen for the next destination at the right time.

BRIEF DESCRIPTION OF THE DRAWINGS

FIGS. 2A–2I are diagrams showing examples of process and display of the navigation system implementing the arrival detection method of the present invention.

DETAILED DESCRIPTION OF THE INVENTION

Figure 1:
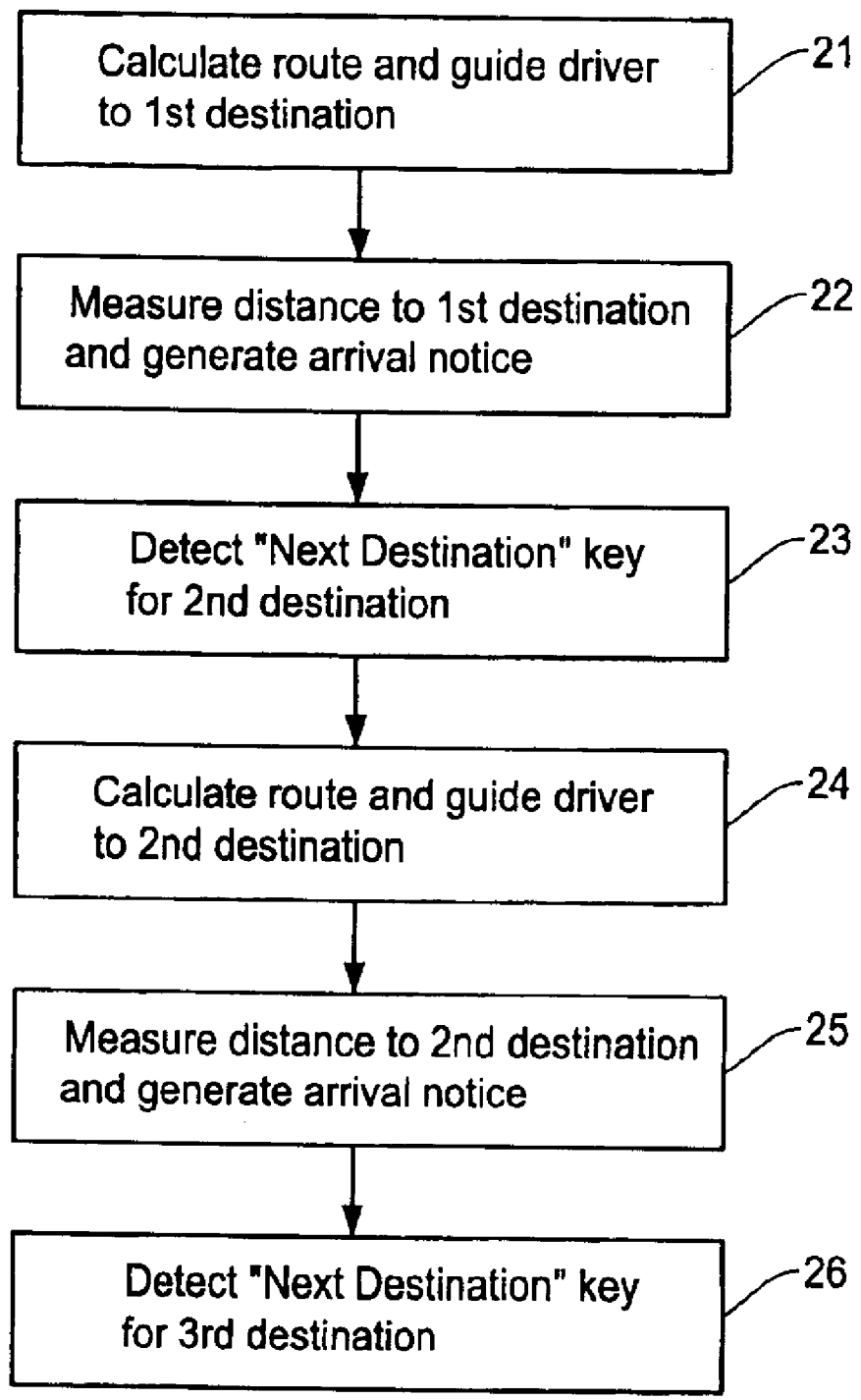
FIG. 1 is a flow chart showing a process involved in the conventional technology to proceed to the next destination when two or more destinations are set in the navigation system.

The present invention will now be described in more detail with reference to the accompanying drawings. The arrival detection method of the present invention automatically determines the arrival of the current destination based on various conditions and parameters and proceeds to the route guidance to the next destination. FIGS. 2A–2I show examples of overall procedure and screen display involved in the navigation system implementing the arrival detection method of the present invention.

FIG. 2A shows a "Confirm Route" screen of the navigation system for confirming the destination. In this example, the "Confirm Route" screen lists the name, address and phone number of the destination. If this is a correct destination, the user enters a "OK to Proceed" key to proceed to the current destination. In FIG. 2B, the navigation system calculates and determines a guided route to the current destination. In this map screen, a user's current position is shown by VP (vehicle position) which indicates that the user's vehicle is off the road such as in a parking lot of a shopping mall. A north pointer NP is also shown on the screen.

After determining the guided route, the navigation system starts the route guidance as shown in FIG. 2C. In this situation, the user must first drive to the highlighted route (guided route) as shown in FIG. 2D. The navigation system shows the intersection which is highlighted to show the next turn and a direction of the turn. In this example, a star mark on the screen denotes the destination which is now 16 miles away from the current vehicle position. The route guidance continues in this manner with a "Guidance Map" screen of FIGS. 2D and 2E.

In the guidance map of FIG. 2E, when the destination is within the predetermined distance, the navigation system indicates that the destination is ahead, in this example, 0.8 miles from the current position. If the vehicle position detected by the navigation system matches the address of the destination according to the map database, the navigation system generates an arrival notice. Thus, the navigation system displays an "Arrival Map" screen of FIG. 2F which displays the name and address of the current destination.

If there is no other destination or the navigation system is not in the mode for accepting two or more destinations (ex. "Trip Itinerary" or "Today's Plan"), the route guidance process ends, and the navigation system shows a locator map screen of FIG. 2G. In the locator map screen, the vehicle position VP is displayed on the map image, but the route guidance is no longer performed. If the navigation system is in the "Trip Itinerary" or "Today's Plan" mode where two or more destinations are specified, the navigation system performs the arrival detection method of the present invention to initiate the route guidance for the next destination.

The arrival detection method of the present invention is conducted within the process shown between FIG. 2F and FIG. 2H to determine whether it is a right time to start the route guidance procedure for the next destination. When various conditions are met, the navigation system starts the route guidance for the next destination by showing a "Confirm Route" screen of FIG. 2H for confirming the next destination. The user presses the "OK to Proceed" key, in FIG. 2I, the navigation system calculates and determines a guided route to the next destination. Thus, the procedure similar to that shown in FIGS. 2C–2F will be repeated for the next destination and the arrival detection method will be applied to the remaining destinations.

Figure 3:
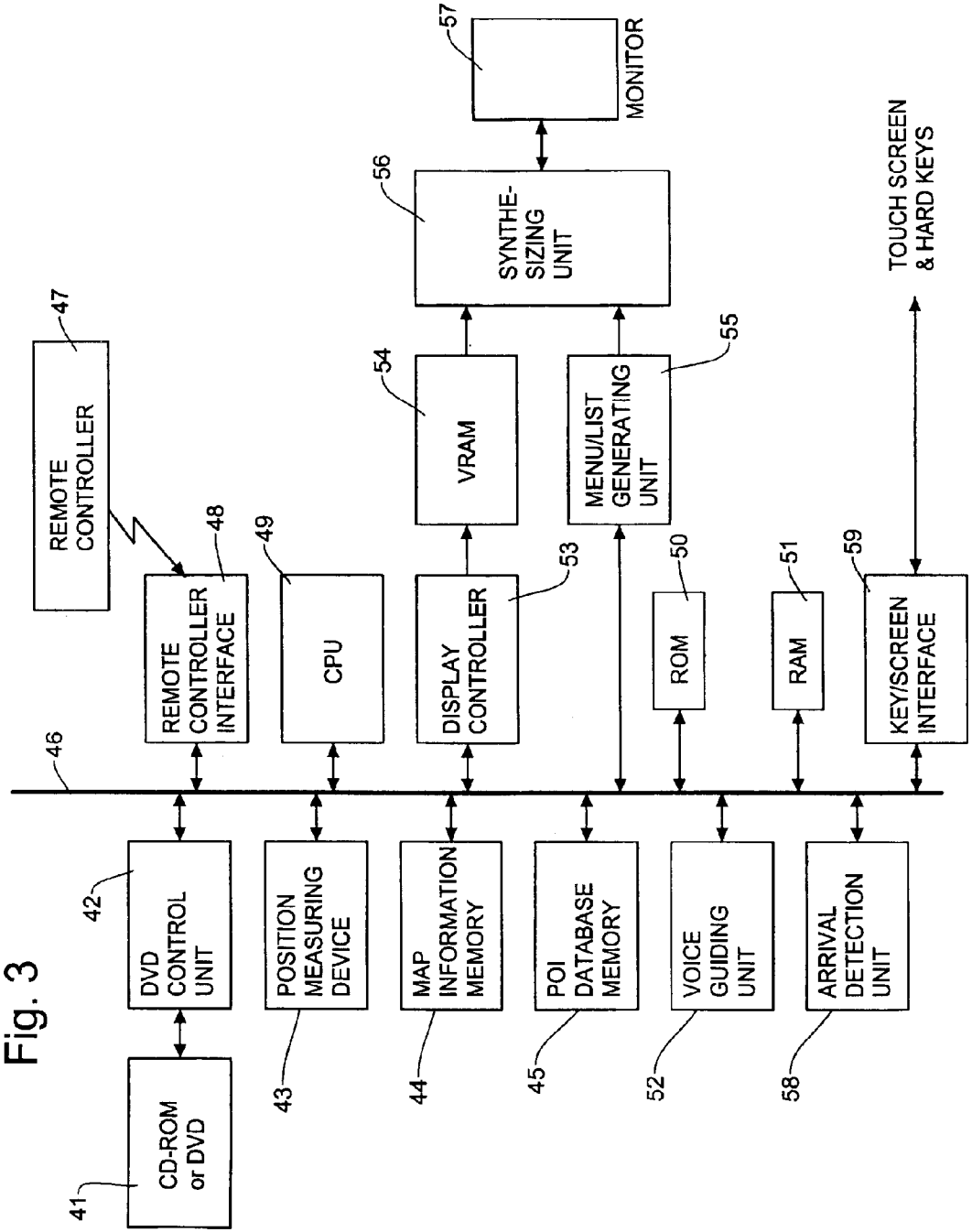
FIG. 3 is a block diagram showing an example of structure in the vehicle navigation system for implementing the arrival detection method of the present invention.

The arrival method of the present invention can be advantageously implemented by a vehicle navigation system. FIG. 3 shows an example of structure of a vehicle navigation system. The navigation system includes a map storage medium 41 such as a CD-ROM, DVD, hard disc or other storage means (hereafter "DVD") for storing map information. The block diagram also includes a DVD control unit 42 for controlling an operation for reading the map information from the DVD, a position measuring device 43 for measuring the present vehicle position. The position measuring device 43 has a vehicle speed sensor for detecting a moving distance based on speed pulses, a gyroscope for detecting a moving direction, a microprocessor for calculating a position and direction, a GPS receiver, etc.

The block diagram of FIG. 3 further includes a map information memory 44 for storing the map information which is read out from the DVD 41, a database memory 45 for storing point of interest (POI) information, etc. read out from the DVD 41, a remote controller 47 for executing a menu selection operation, a map scale change operation, a destination input operation, etc. and a remote controller interface 48.

In addition to the remote controller 47, the navigation system usually includes various other input methods to achieve the same and similar operations done through the remote controller. For example, a navigation system may include hard keys and a joystick on a head unit of the navigation system mounted on a dash board, touch screen of the display panel, and voice communication means.

In the block diagram of FIG. 3, the navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guided route, a voice interface and guiding unit 52 for voice communication interface and spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, and a screen interface 59 for interfacing with various other input means such as hard keys system or a touch screen of the navigation system.

The navigation system further includes an arrival detection unit 58 for arrival detection procedure of the present invention. The arrival detection unit may include a controller for examining the various conditions and parameters for judging the arrival of the current destination, and a buffer memory for temporarily storing the information unique to the specified destination. Alternatively, the arrival detection procedure may be performed by storing an additional program specially made for this purpose in the ROM 50.

Figure 4:
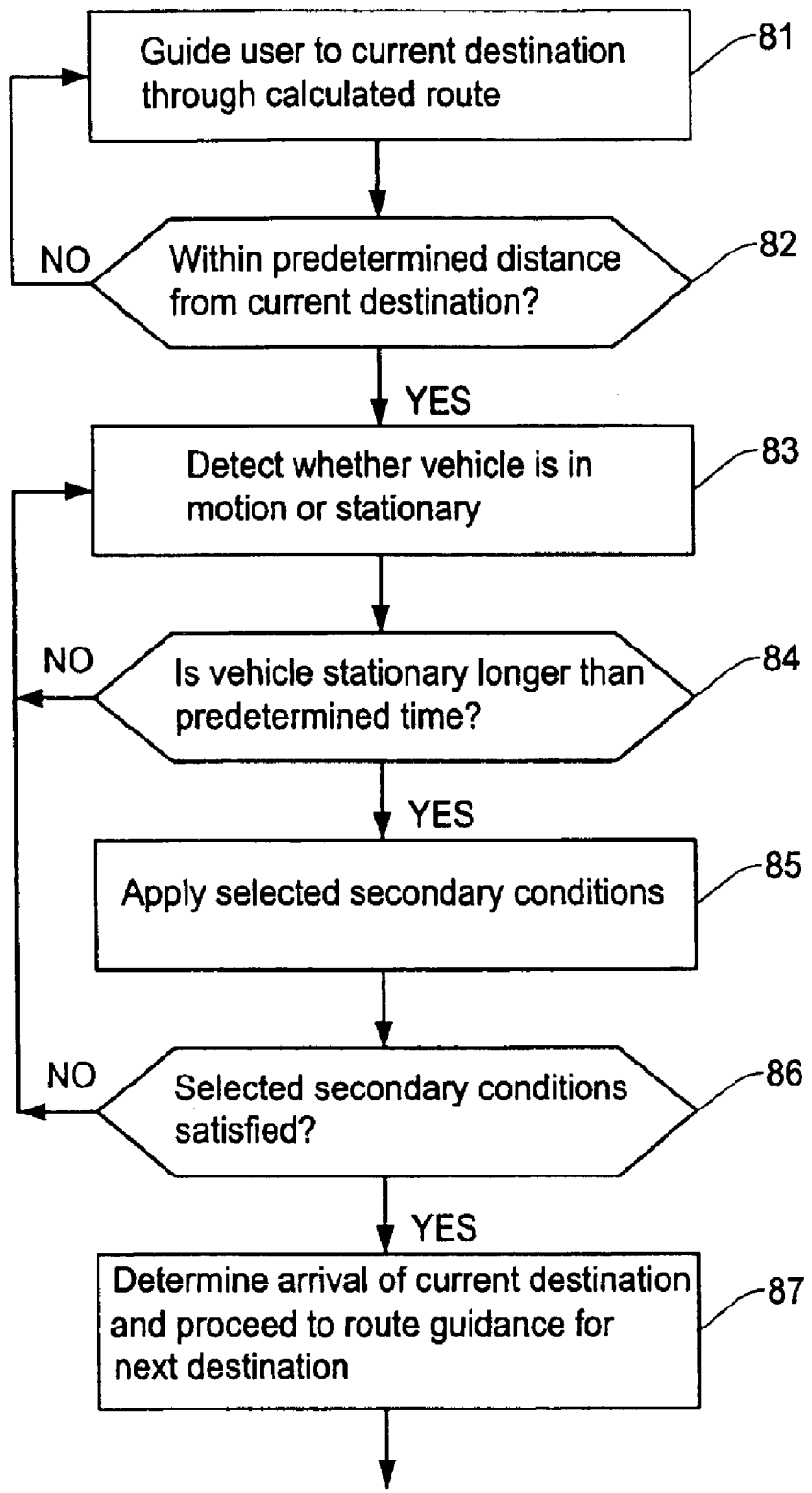
FIG. 4 is a flow chart showing an example of process for detecting the arrival of the current destination and proceed to the next destination in accordance with the arrival detection method of the present invention.

An example of process of the present invention for detecting the arrival of the current destination is shown in the flow chart of FIG. 4. As noted above, this process is performed after the navigation system detects that the user is within the area of the current destination as shown in FIG. 2G for determining the correct timing to proceed to the next destination. In other words, the arrival detection method of the present invention is a process for determining a timing for automatically changing the screen to the "Confirm Route" screen of FIG. 2H to proceed to the next destination.

In FIG. 4, the navigation system guides the user to the current destination through the route guidance mode shown in FIGS. 2C–2E (step 81). The navigation system measures a distance to the current destination to detect whether the current destination is within a predetermined range such as within 100 meters (step 82). If the current destination is within the predetermined distance, the navigation system detects whether the vehicle is stationary or in motion (step 83). This detection is made by the position measuring device 43 of FIG. 3 using the speed sensor (speed pulse) and/or gyroscope.

If the vehicle is stationary, the navigation system determines whether the vehicle is stationary for longer than a predetermined time length (step 84). This is an example of primary condition in the arrival detection method of the present invention although this condition may not always be necessary for implementing this invention. An example of the time length is 10 seconds or longer. Even though the vehicle is stationary for more than 10 seconds, the user may have not arrived at the current destination. For example, in the case where the user's vehicle is in a left turn lane waiting for entering the current destination such as a shopping mall, the 10-second duration may easily elapse.

Thus, in the present invention, the navigation system applies additional tests. Namely, if the vehicle is stationary for longer than the predetermined time length, the navigation system applies one or more secondary conditions selected from various parameters (step 85). The navigation system determines whether the selected secondary condition is met (step 86). In the above example where the user is waiting in the left turn lane, an example of the selected secondary condition will be whether the vehicle has made a turn. If the secondary condition is satisfied, the navigation system determines the arrival of the current destination and proceeds to the route guidance for the next destination (step 87).

Such secondary conditions or parameters include (1) speed pulse (to detect the car is stationary or reverse drive after stationary), (2) gyroscope signal (to detect a turn or otherwise change of direction), (3) parking brake (which may be used when the user intends to park the vehicle), (4) turn signal (if so, the user may still be on the street rather than a parking lot), (5) reverse (if so, the car may be maneuvering for the parking spot or leaving the parking spot), (6) destination type (for example, at gas stations and rest areas, the system may wait for the likely engine shutdown instead of the timeout, whereas at fast-food restaurants, the system should take into account the possibility of a drive-through where the driver typically would not turn off the engine), (7) on street segment (some destinations can be immediately off the curb such as mail box and residence), (8) off street segment (parking or particular shop in a large shopping mall may be off the street), (9) distance from street segment (larger the distance, more likely the user has arrived at the destination), and (10) vehicle movement pattern (if vehicle stopped for a while off a street segment, then began moving back toward the street segment, it is likely that the user has accomplished the purpose of the visit at the current destination).

Figure 5:
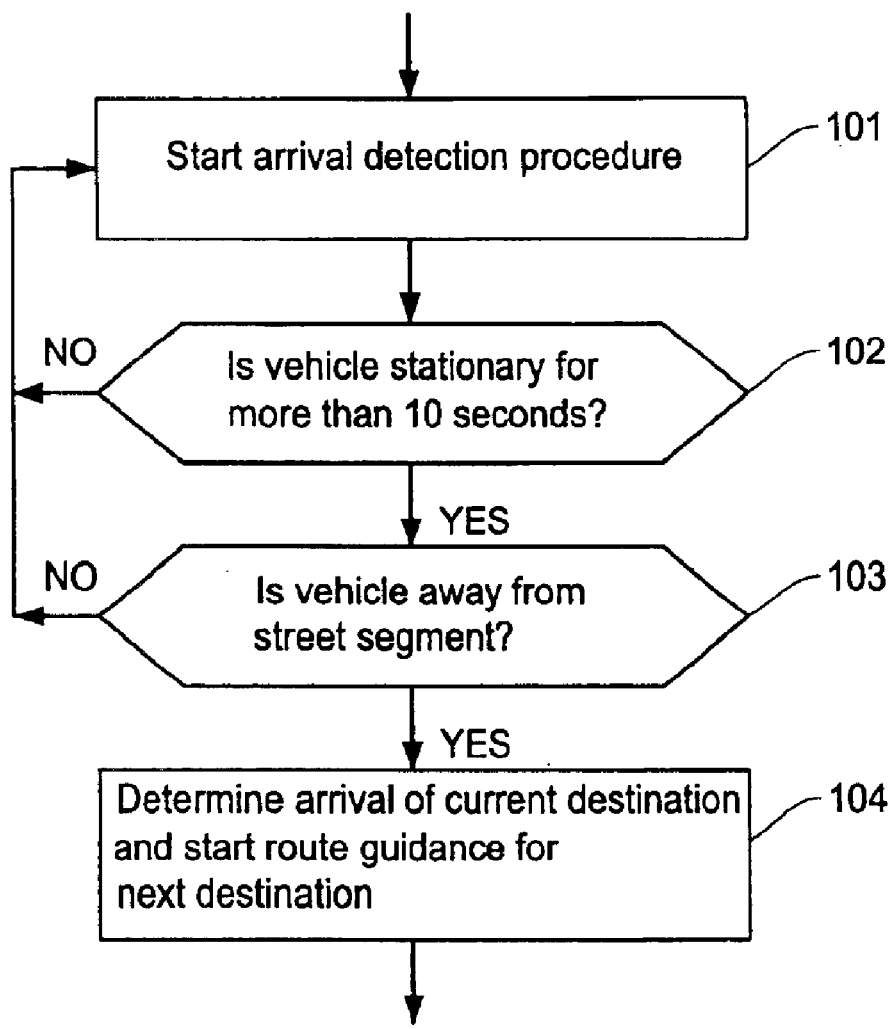
FIG. 5 is a flow chart showing an example of process in the arrival detection method of the present invention which includes a combination of primary and secondary conditions.

An example of process in the arrival detection method including a combination of conditions is shown in a flow chart of FIG. 5. This process roughly corresponds to the steps 85 and 86 of FIG. 4 for applying the secondary conditions. In FIG. 5, the navigation system starts the arrival detection procedure when the vehicle is within the predetermined distance to the current destination (step 101). In this step, the navigation system detects whether the vehicle is stationary.

When the vehicle is stationary, the navigation system determines whether the car is stopped for a time longer than the predetermined time length such as 10 seconds (step 102). In this example, the further condition is examined as to whether the vehicle is on the street segment or off the street segment. This condition is advantageously applicable to the situation noted above where the vehicle is on the left turn lane (i.e., still on the street segment) before entering the destination. The navigation system checks the position of the vehicle as to whether it is out of the street segment (step 103). If this condition is met, the navigation system determines that the vehicle has arrived at the current destination and proceeds to the route guidance for the next destination (step 104).

Figure 6:
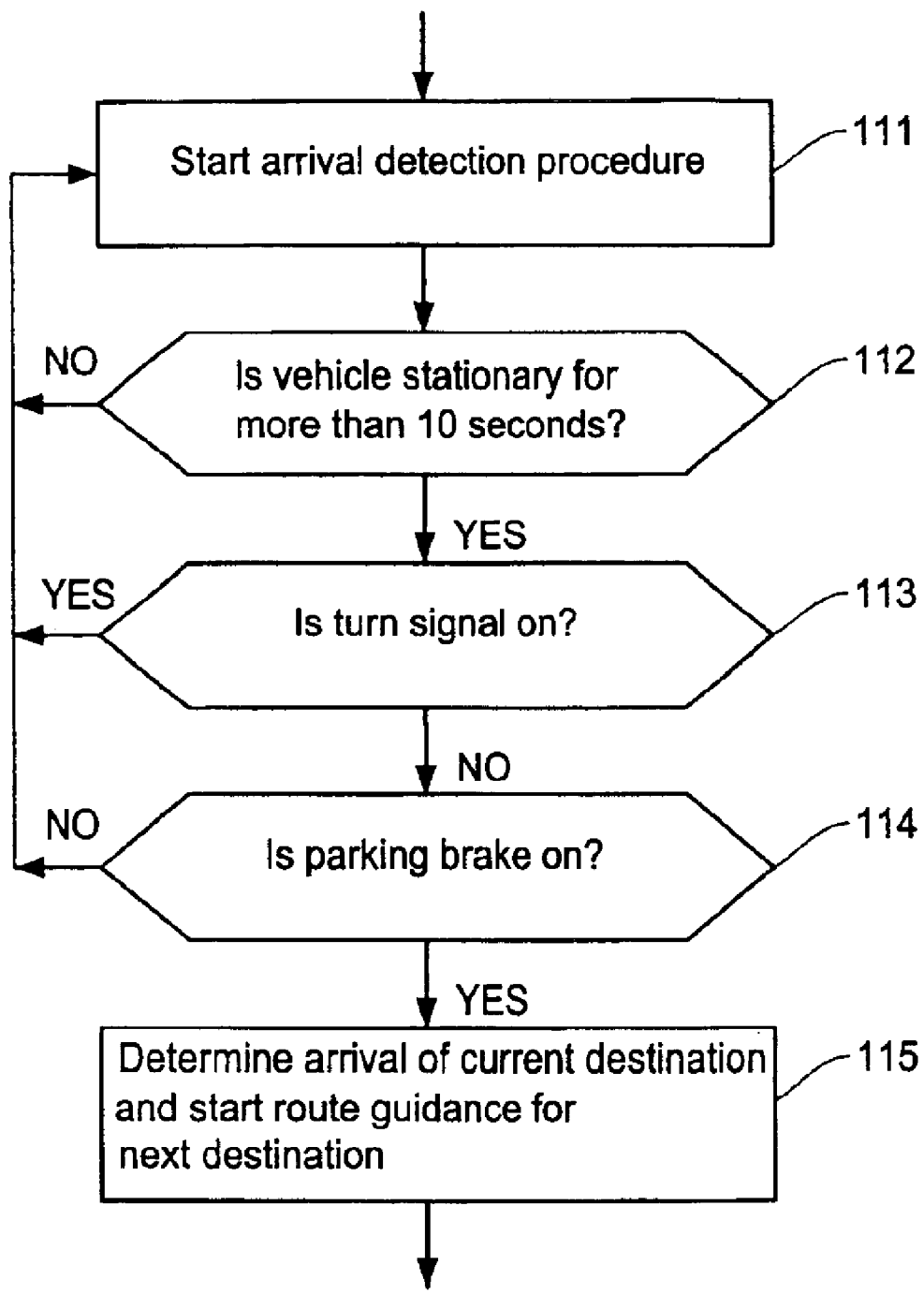
FIG. 6 is a flow chart showing another example of process in the arrival detection method of the present invention which includes a combination of two or more conditions.

Another example of process in the arrival detection method including a combination of conditions is shown in a flow chart of FIG. 6. This process roughly corresponds to the steps 85 and 86 of FIG. 4 for applying the secondary conditions. In FIG. 6, the navigation system starts the arrival detection procedure when the vehicle is within the predetermined distance to the current destination (step 111). In this step, the navigation system detects whether the vehicle is stationary.

When the vehicle is stationary, the navigation system determines whether the vehicle has been stopped for longer than the predetermined time length such as 10 seconds (step 112). If this condition is met, the navigation system applies additional conditions. In this example, one of the additional conditions is whether the vehicle turn signal is on or off. This condition is advantageously applicable to a situation where a user is in the parking lot of the current destination because a user usually does not use the turn signal in such a case. On the other hand, if the user is waiting on the street for some reasons, he may turn on the turn signal. Thus, the navigation system checks whether the turn signal of the vehicle is not activated by the user (step 113).

If this condition is met (turn signal was not used), the navigation system applies another condition as to whether the parking brake is on (step 114). If the parking brake is used, it is more likely that the user has arrived at the current destination rather than he is looking for a parking spot. Thus, if this condition is satisfied, the navigation system determines that the vehicle has arrived at the current destination and proceeds to the route guidance for the next destination (step 115).

Figure 7:
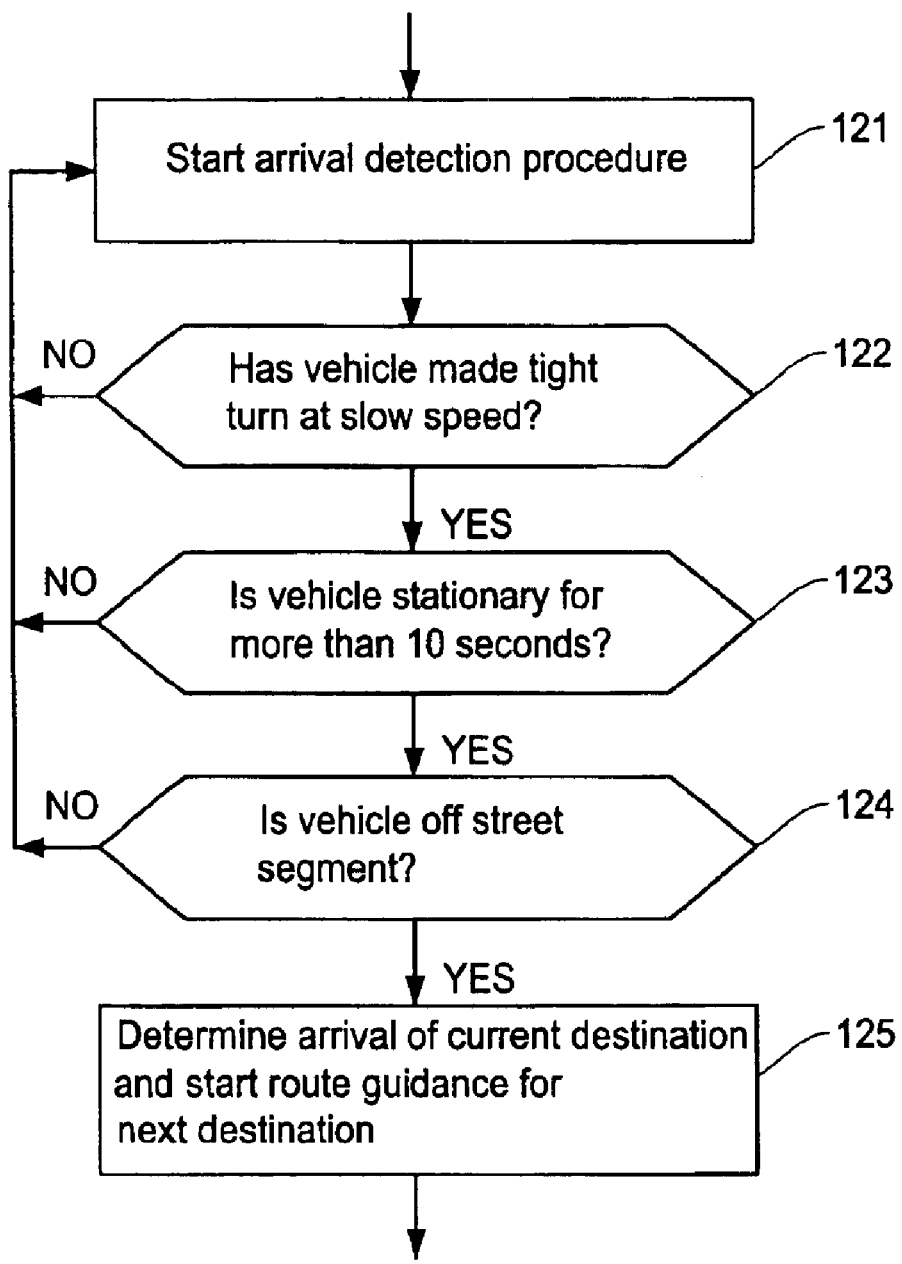
FIG. 7 is a flow chart showing a further example of process in the arrival detection method of the present invention which includes a combination of two or more conditions.

Another example of process in the arrival detection method including a combination of conditions is shown in a flow chart of FIG. 7. This process roughly corresponds to the steps 85 and 86 of FIG. 4 for applying the secondary conditions. In FIG. 7, the navigation system starts the arrival detection procedure when the vehicle is within the predetermined distance to the current destination such as within 100 meters (step 121).

The navigation system examines whether the vehicle has made a tight turn (at a short radius such as 20 feet) at a slow speed (such as less than 5 MPH), based on the signal from the gyroscope and the motion (speed) data from the vehicle (step 122). If this condition is met, it is more likely that the user is in the parking maneuver rather than looking for the destination. The navigation system further detects whether the vehicle is stationary, and if so, whether it is longer than the predetermined time length such as 10 seconds (step 123). It should be noted that the order of the above conditions in the steps 122 and 123 can be reversed. If these conditions are satisfied, it becomes further likely that the vehicle is in the parking lot.

Another additional condition in this example is whether the vehicle current position is off the street segment (step 124). This condition is advantageously applicable to distinguish whether the vehicle is still at the entrance of the parking lot which may be on the street segment waiting for the parking space or the vehicle is already parked at the parking spot which may be away from the street segment. Thus, if this condition is satisfied, the navigation system determines that the vehicle has arrived at the current destination and proceeds to the route guidance for the next destination (step 125).

Figure 8:
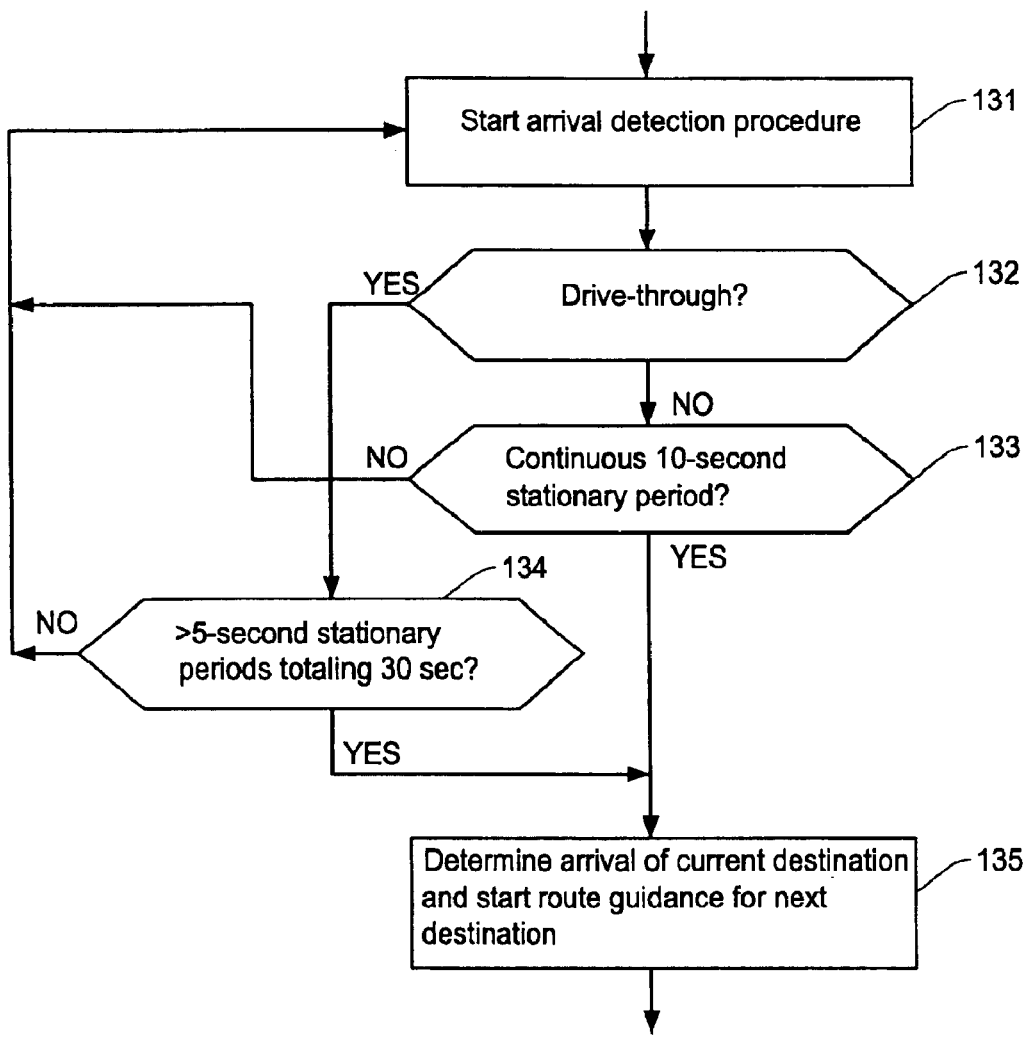
FIG. 8 is a flow chart showing a further example of process in the arrival detection method of the present invention which includes a combination of two or more conditions.

A further example of process in the arrival detection method including a combination of conditions is shown in a flow chart of FIG. 8. This process roughly corresponds to the steps 85 and 86 of FIG. 4 for applying the secondary conditions. The feature of this process is to consider the type of destination, for example, types of POI such as a drive-through restaurant. In FIG. 8, the navigation system starts the arrival detection procedure when the vehicle is within the predetermined distance to the current destination such as within 100 meters (step 131).

The navigation system examines whether the vehicle is at a specific type of POI such as a drive-through restaurant (step 132). It should be noted that the purpose of the arrival detection in the present invention is to determine the timing for starting the route guidance for the next destination. Thus, even if this drive-through is the current destination specified by the user, it does not always mean that the vehicle has arrived at the destination in the sense of starting the route guidance for the next destination.

Thus, in the step 132, if this condition is met, the navigation system further applies the additional test in step 134. Namely, when the vehicle is in the drive-through, the navigation system further examines whether the total time for the vehicle stopped is more than a predetermined length (step 134). For example, the navigation system accumulates each stop time when each stop is longer than, for example 5 seconds. Thus, the condition of the continuous 10-second stationary period may be modified to, for example, a total of 30 seconds, which is calculated by adding continuous stationary periods of at least 5 seconds each that are not separated by more than 5 seconds or 7 meters of motion.

If the total stationary time exceeds 30 seconds, it is likely that the user has completed the purpose in the current destination (e.g. to buy hamburger in the drive-through restaurant). Accordingly, if this condition is satisfied, the navigation system determines that the vehicle has arrived at the current destination and proceeds to the route guidance for the next destination (step 135).

When the condition in the step 132 is not satisfied, the navigation system further detects whether the vehicle is stationary, and if so, whether the stationary time is longer than the predetermined time length such as 10 seconds (step 133). If this condition is satisfied, it becomes likely that the vehicle is parked at the current destination. Thus, the navigation system determines the arrival at the current destination and proceeds to the route guidance for the next destination (step 135).

Figure 9:
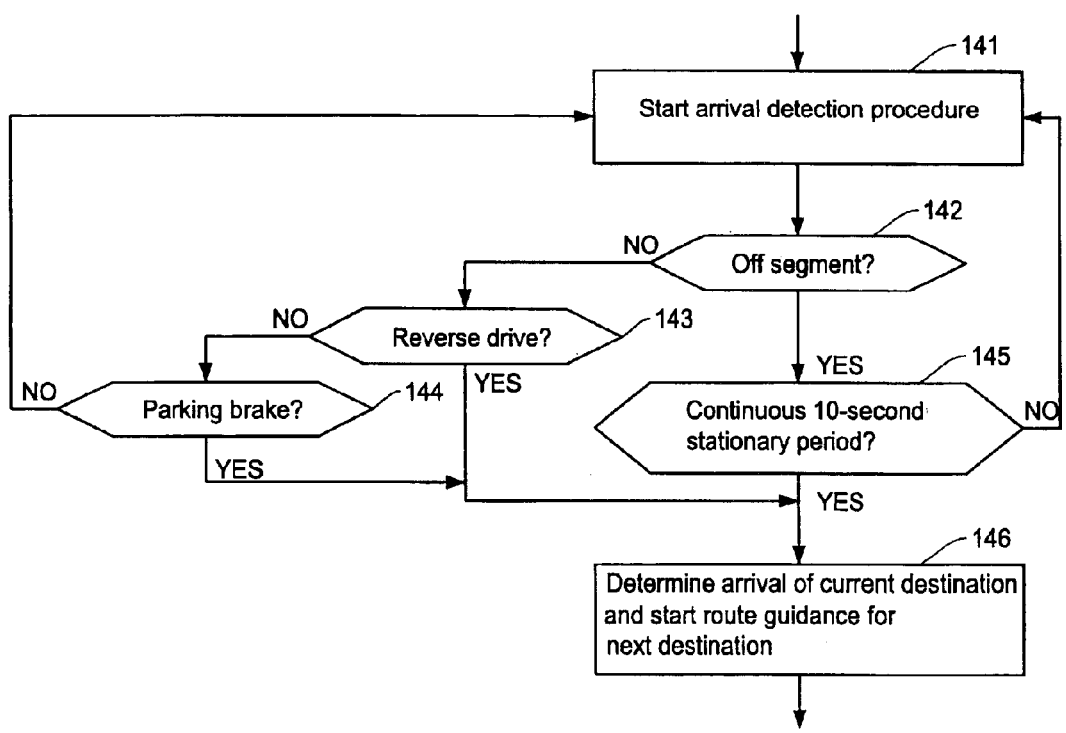
FIG. 9 is a flow chart showing a further example of process in the arrival detection method of the present invention which includes a combination of two or more conditions.

A further example of process in the arrival detection method including a combination of conditions is shown in a flow chart of FIG. 9. This process roughly corresponds to the steps 85 and 86 of FIG. 4 for applying the secondary conditions. FIG. 9, the navigation system starts the arrival detection procedure when the vehicle is within the predetermined distance to the current destination such as within 100 meters (step 141).

The navigation system examines whether the vehicle is away from the street segment by more than a predetermined distance A such as 15 meters (step 142). If this condition is met, it is likely that the user is in the parking lot of the current destination. Then the navigation system examines whether the vehicle is stationary for more than a predetermined time length such as 10 seconds (step 145). If this condition is also satisfied, the navigation system determines that the vehicle has arrived at the current destination and proceeds to the route guidance for the next destination (step 146).

In the step 142, if the vehicle is not sufficiently away from the street segment, the navigation system further examines whether the vehicle moved backward (reverse drive) based on the reverse gear signal of the vehicle (step 143). If the vehicle moved in the backward direction, the user may be maneuvering for the parking spot or leaving the parking spot, which means the arrival of the current destination. Thus, if this condition is satisfied, the navigation system determines that the vehicle has arrived at the current destination and proceeds to the route guidance for the next destination (step 146).

In this example, if the condition in the step 143 is not met, the navigation system further checks whether the parking brake is on (step 144). If the parking brake is used, it is more likely that the user has arrived at the current destination rather than he is waiting for a parking spot. Thus, if this condition is satisfied, the navigation system determines the arrival of the current destination and proceeds to the route guidance for the next destination (step 146)

As has been described above, according to the present invention, the navigation system detects the arrival at the current destination, and proceeds in a timely fashion to the route guidance operation for the next destination. The arrival detection method is performed with use of two or more conditions or parameters, thereby accurately detecting the arrival at the current destination. Accordingly, the navigation system is able to show an appropriate screen such as the "Confirm Route" screen for the next destination at the right time.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for guiding a user to a destination based on a map data where two or more destinations are set in a navigation system, comprising the following steps of:

guiding a vehicle of the user to a current destination through a guided route by a route guidance operation of the navigation system;

detecting whether a current vehicle position is within a predetermined distance from the current destination;

applying a primary condition when the vehicle reaches within said predetermined distance from the current destination;

applying a secondary condition when the primary condition is met;

determining arrival at the current destination when the secondary condition is met;

displaying a screen which asks user's authorization to proceed to a route guidance operation for a next destination; and starting the route guidance operation for the next destination upon receipt of the user's authorization;

wherein the primary condition is a time length during which the vehicle is stationary within said predetermined distance from the current destination.

2. A navigation method as defined in claim 1, wherein the secondary condition is whether the vehicle is on or away from a street segment of the map data defined by an address of the current destination when the primary condition is satisfied.

3. A navigation method as defined in claim 1, wherein the secondary condition is whether a turn signal of the vehicle is activated or not after the primary condition is satisfied.

4. A navigation method as defined in claim 1, wherein the secondary condition is whether a parking brake of the vehicle is used after the primary condition is satisfied.

5. A navigation method as defined in claim 1, wherein the secondary condition is whether the vehicle has made a turn before or after the primary condition is satisfied.

6. A navigation method as defined in claim 1, wherein the secondary condition is to consider a type of current destination and when the type of destination so requires, the arrival of the current destination is determined even if the primary condition is not met.

7. A navigation method as defined in claim 1, wherein the secondary condition is whether the vehicle moves in the backward direction.

8. A navigation method as defined in claim 1, wherein the secondary condition is a degree of distance between the vehicle and a street segment of the map data defined by the address of the current destination.

9. A navigation method as defined in claim 1, wherein the time length during which the vehicle is stationary is ten seconds.

10. A navigation method for guiding a user to a destination based on a map data where two or more destinations are set in a navigation system, comprising the following steps of:

guiding a vehicle of the user to a current destination through a guided route by a route guidance operation of the navigation system;

detecting whether a current vehicle position is within a predetermined distance from the current destination;

applying at least two conditions when the vehicle is within said predetermined distance;

determining arrival at the current destination when the two conditions are met;

displaying a screen which asks user's authorization to proceed to a route guidance operation for a next destination; and starting the route guidance operation for the next destination upon receipt of the user's authorization;

wherein one of said two conditions is a time length during which the vehicle is stationary within the predetermined distance from the current destination.

11. A navigation method as defined in claim 10, wherein another condition is whether the vehicle is on or away from a street segment of the map data defined by an address of the current destination.

12. A navigation method as defined in claim 10, wherein another condition is whether a turn signal of the vehicle is activated or not.

13. A navigation method as defined in claim 10, wherein another condition is whether a parking brake of the vehicle is used.

14. A navigation method as defined in claim 10, wherein another condition is whether the vehicle has made turn before or after the other condition is satisfied.

15. A navigation method as defined in claim 10, wherein another condition is to consider a type of current destination and when the type of destination so requires, the arrival of the current destination is determined even if part of the set of condition is not met.

16. A navigation method as defined in claim 10, wherein another condition is whether the vehicle moves in the backward direction.

17. A navigation method as defined in claim 10, wherein another condition is a degree of distance between the vehicle and a street segment of the map data defined by the address of the current destination.

18. A navigation method for guiding a user to a destination based on a map data where two or more destinations are set in a navigation system, comprising the following steps of:

guiding a vehicle of the user to a current destination through a guided route by a route guidance operation of the navigation system;

detecting whether a current vehicle position is within a predetermined distance from the current destination;

detecting whether the vehicle is stationary or in motion within said predetermined distance, evaluating a time length during which the vehicle is stationary;

detecting whether an engine of the vehicle is shut down after detecting that the vehicle is a stationary;

determining arrival at the current destination when detecting the engine shut down; and displaying a screen which asks user's authorization to proceed to a route guidance operation for a next destination; and proceeding to a route guidance operation for the next destination upon receipt of the user's authorization.

\* \* \* \* \*